(12) United States Patent
Quell et al.

(10) Patent No.: US 8,133,029 B2
(45) Date of Patent: Mar. 13, 2012

(54) ROTOR BLADE ATTACHMENT

(75) Inventors: Peter Quell, Osterronfeld (DE); Urs Bendel, Fockbek (DE); Matthias Schubert, Rendsburg (DE); Carsten Eusterbarkey, Simonsberg (DE)

(73) Assignee: Repower Systems AG, Hamburg (DE)

( * ) Notice: Subject to any disclaimer, the term of this patent is extended or adjusted under 35 U.S.C. 154(b) by 644 days.

(21) Appl. No.: 12/299,055

(22) PCT Filed: Apr. 20, 2007

(86) PCT No.: PCT/EP2007/003481
§ 371 (c)(1),
(2), (4) Date: Nov. 5, 2008

(87) PCT Pub. No.: WO2007/131589
PCT Pub. Date: Nov. 22, 2007

(65) Prior Publication Data
US 2009/0263250 A1 Oct. 22, 2009

(30) Foreign Application Priority Data
May 11, 2006 (DE) .......................... 10 2006 022 272

(51) Int. Cl.
*F03D 11/00* (2006.01)
*F03D 11/02* (2006.01)
(52) U.S. Cl. ............. 416/204 R; 416/210 R; 416/229 R
(58) Field of Classification Search .................. None
See application file for complete search history.

(56) References Cited

U.S. PATENT DOCUMENTS

| 2,863,513 A | 12/1958 | Metzger |
|---|---|---|
| 3,161,239 A | 12/1964 | Andersen |
| 3,713,753 A | 1/1973 | Brunsch |

(Continued)

FOREIGN PATENT DOCUMENTS

DE 408174 1/1925
(Continued)

OTHER PUBLICATIONS

Beitz, Wolfgang et al.; Dubbel: Taschenbuch Fur Den Maschinenbau; 18th Edition; Springer-Verlag; 1995; pp. C12-C16 (English abstract included).

(Continued)

*Primary Examiner* — Scott B Geyer
(74) *Attorney, Agent, or Firm* — Rankin, Hill & Clark LLP (57) ABSTRACT

The invention relates to a rotor blade attachment (17), in particular of a wind power plant (1), for the connection of a rotor blade (5) with an attachment device (4), including a transverse pin (20, 20') and a connecting device (13, 21), which can be brought together to establish an operative connection, wherein the connecting device (13, 21) defines a longitudinal axis. The rotor blade attachment (17) is characterized in that the transverse pin (20, 21') in the direction of the longitudinal axis of the connecting device has a higher bending stiffness than transversally to the longitudinal axis (18). An alternative rotor blade attachment (17) is characterized in that the transverse pins (20, 20') are arranged in at least two rows (33, 34), wherein at least a first row (33) is arranged closer to the blade-root-side end (19) of the rotor blade (5) than at least a second row (34). Another rotor blade attachment (17) is characterized in that the transverse pin (20, 20') is completely encapsulated by the rotor blade (5).

34 Claims, 8 Drawing Sheets

U.S. PATENT DOCUMENTS

| | | | |
|---|---|---|---|
| 3,835,610 A * | 9/1974 | Harper et al. | 403/231 |
| 4,030,846 A * | 6/1977 | Flototto | 403/231 |
| 4,148,594 A | 4/1979 | Stafford | |
| 4,236,873 A | 12/1980 | Sherman et al. | |
| 4,367,864 A * | 1/1983 | Eldeen | 256/59 |
| 4,412,784 A | 11/1983 | Wackerle et al. | |
| 4,643,646 A | 2/1987 | Hahn et al. | |
| 4,732,542 A | 3/1988 | Hahn et al. | |
| 4,976,587 A * | 12/1990 | Johnston et al. | 416/230 |
| 5,458,465 A * | 10/1995 | von Wieser et al. | 416/214 R |
| 5,664,899 A * | 9/1997 | Eustis | 403/268 |
| 6,213,719 B1 * | 4/2001 | Violette et al. | 416/205 |
| 6,371,730 B1 | 4/2002 | Wobben | |
| 6,443,701 B1 | 9/2002 | Muhlbauer | |
| 6,537,031 B1 * | 3/2003 | Bacskay | 416/207 |
| 6,663,314 B2 | 12/2003 | Bequet | |
| 2007/0122283 A1 | 5/2007 | Wobben | |

FOREIGN PATENT DOCUMENTS

| | | |
|---|---|---|
| DE | 2658876 A1 | 6/1978 |
| DE | 2753187 A1 | 12/1978 |
| DE | 2937895 C2 | 4/1980 |
| DE | 3103710 C2 | 8/1982 |
| DE | 3109566 A1 | 10/1982 |
| DE | 29618525 U1 | 6/1997 |
| DE | 19733372 C1 | 1/1999 |
| DE | 19903550 C1 | 5/2000 |
| DE | 10324166 A1 | 12/2004 |
| DE | 10336998 A1 | 3/2005 |
| DE | 20320626 U1 | 3/2005 |
| DE | 60202796 T2 | 2/2006 |
| EP | 0061567 A2 | 10/1982 |
| EP | 1234984 A2 | 8/2002 |
| EP | 1486415 A1 | 12/2004 |
| FR | 565621 | 1/1924 |
| FR | 2683007 | 4/1993 |
| GB | 2026623 A | 2/1980 |
| GB | 2029911 A | 3/1980 |
| GB | 1567968 | 5/1980 |
| WO | 01/42647 A2 | 6/2001 |
| WO | 03/082551 A1 | 10/2003 |

OTHER PUBLICATIONS

Hau, Erich; "Windkraftanlagen: Grundlagen, Technik, Einsatz, Wirtschaftlichkeit"; Springer Publishing; Berlin, Germany; 1996; pp. 186-213; XP002143305.

* cited by examiner

ROTOR BLADE ATTACHMENT

BACKGROUND OF THE INVENTION

1. Field of the Invention

The invention relates to a rotor blade attachment, in particular of a wind power plant, for the connection of a rotor blade with an attachment device, including a transverse pin and a connecting device, which can be brought together to establish an operative connection, wherein the connecting device defines a longitudinal axis.

Furthermore, the invention relates to a rotor blade attachment with several transverse pins, each of which can be brought together with a connecting device to establish an operative connection. Furthermore, the invention relates to a rotor blade attachment, including a transverse pin in operative connection with a connecting device, wherein at least the connecting device is pretensioned.

2. Description of Related Art

Rotor blade attachments for the connection of a rotor blade with an attachment device are known, for example from WO 01/42647 A2. In particular, screws penetrating holes in a rotor hub that are screwed into transverse bolts and that are pretensioned using a nut are hereby used. This type of rotor blade attachment is easy to implement and reliable. These types of rotor blade attachments generally have three competing framework conditions, namely the strength of the transverse pin or transverse bolt, the bearing stress, i.e. in particular the surface pressure of the transverse bolt in the rotor blade, and the strength or residual strength of the rotor blade shell, which is decreased based on the perforation created by the provision of holes for the receiving of the transverse pins in comparison to the non-perforated blade shell. Based on these framework conditions, the transverse pins in this type of rotor blade attachment can only be packed tightly in a limited manner so that in comparison to other blade attachments, for example glued-in flanges or glued-in inserts, as disclosed in EP 1 486 415 A1 and DE 296 18 525 U1, a larger overall diameter of the rotor blade attachment is required in order to accommodate a specified number of blade bolts or a clearly greater wall thickness is needed.

BRIEF SUMMARY OF THE INVENTION

The object of the present invention is to specify alternative rotor blade attachments that enable a secure rotor blade attachment for the connection of a rotor blade with an attachment device, wherein a sufficiently firm connection is made possible even for large rotor blades with the least possible material consumption or a smallest possible thickness of the blade shell.

This object is solved through a rotor blade attachment, in particular of a wind power plant, for the connection of a rotor blade with an attachment device, including a transverse pin and a connecting device, which can be brought together to establish an operative connection, wherein the connecting device defines a longitudinal axis, which is further established in that, in the direction of the longitudinal axis of the connecting device, the transverse pin has a higher bending stiffness than transversally to the longitudinal axis.

Through this measure according to the invention, it is possible to reduce the width of the transverse pin in comparison to a round transverse pin so that the holes provided in the blade shell of the rotor blade for receiving the transverse pin can be made smaller, whereby the problem of the perforation or the too strong perforation is reduced and whereby a higher transverse pin density can be provided.

Within the framework of the invention, the term attachment device includes, in particular, the pitch bearing, rotor hub or general attachment component. Preferably, the transverse pin in the direction of the longitudinal axis of the connecting device has a greater elongation than transversally to the direction of the longitudinal axis of the connecting device. A particularly simple realization is possible through this preferable design of the rotor blade attachment. Within the framework of the invention, the expansion in the direction of the longitudinal axis of the connecting device is also called the height.

The transverse pin in the cross-section is preferably designed in a rectangular manner with rounded edges. A particularly stable transverse pin can be realized in this manner. If the transverse pin in the cross-section is elliptical, oval, partially elliptical or partially oval, allowances are made for the problem that the material surrounding the transverse pin, in particular glass fiber reinforced plastic in comparison to a material of which the transverse pins are made, such as metal for example, is considerably softer. In an, in particular partially, oval or preferably elliptical form of the transverse pin in the cross-section, the force pressing on the surrounding material in the case of a rotor blade attachment that is in use or in the case of pretensioned connection is distributed evenly in the material surrounding the transverse pin.

The transverse pin is preferably designed with a double-T-shaped cross-section with rounded edges or in an osteoidal manner. This results in a material-saving design of the transverse pin, which is nonetheless designed in a sufficiently stable manner.

The object is further solved through a rotor blade attachment, in particular of a wind power plant, which realizes in particular characteristics of the above rotor blade attachment, for the connection of a rotor blade with an attachment device, including several transverse pins, each of which can be brought together with a connecting device to establish an operative connection, wherein the transverse pins are arranged in at least two rows, wherein at least one first row is arranged closer to the blade-root end of the rotor blade than at least one second row. It is also possible through this measure to increase the density of the transverse pins to be used for the rotor blade attachment and connecting devices so that a secure rotor blade attachment is ensured.

If the rows are preferably arranged around the perimeter of the blade root of the rotor blade, an especially reliable rotor blade attachment results.

If the operative connection of the connecting devices with the transverse pins, which are arranged in the second row, is designed softer in comparison with the operative connection of the connecting devices with the transverse pins, which are arranged in the first row, a more even force distribution at the rotor blade attachment is possible to the material surrounding the transverse pins and the transverse pins.

This can, in particular, be realized in that the connecting devices are at least partially different in length. The connecting devices assigned to the first row are preferably shorter than the connecting devices assigned to the second row. In a particularly preferred exemplary embodiment, the connecting devices are at least partially different in thickness. This can occur in that the connecting devices are partially different in thickness area by area distributed over the length or in that the connecting devices are different in thickness with respect to each other or a combination of the two aforementioned variants. The connecting devices assigned to the first row of transverse pins are preferably thicker than the connecting devices assigned to the second row of transverse pins. A softer connection of the connecting device with the transverse pins, which are arranged in the second row, is realized in comparison to the operative connection of the connecting devices with the transverse pins that are arranged in the first row.

The object is further solved through a rotor blade attachment, in particular for a wind power plant, in particular with an at least partial realization of the aforementioned characteristics of a rotor blade attachment according to the invention for the connection of a rotor blade with an attachment device including a transverse pin and a connecting device, which can be brought together to establish an operative connection, wherein the rotor blade attachment is further established in that the transverse pin is fully encapsulated by the rotor blade. In the case of this measure according to the invention, the material that fully encapsulates or surrounds the transverse pin also serves to increase the stability of the rotor blade in the area of the transverse pins, whereby an increased density of transverse pins in the area of the arrangement of transverse pins is possible. If the encapsulation of the outer surface and the sides of the transverse pin facing the inner surface of the rotor blade occurs through a material used in the rotor blade, in particular through at least one laminate layer, a particularly simple and efficient encapsulation of the transverse pin is possible. The laminate layer preferably consists or comprises fiber reinforced plastic. Several laminate layers can also be provided. The at least one laminate layer is preferably reinforced through one or more reinforcement material layers, in particular metal layers.

The sides of the transverse pin facing the outer surface and the inner surface of the rotor blade are preferably encapsulated with a material thickness of 5 mm to 20 mm, in particular 10 mm to 15 mm, in the case of a 35 m to 55 m long rotor blade.

The encapsulating material preferably goes far beyond the area of the transverse pin installed in the rotor blade. The encapsulating material is hereby designed in the most cohesive manner possible, for example through one or more penetrating layers made of fiber reinforced plastic and/or one or more penetrating layers of reinforcing material.

If the transverse pin has an opening on at least one side, which faces the inner surface and/or the outer surface of the rotor blade, in which a tool can be inserted at least indirectly in a form- and/or friction-fit manner, it can be replaced relatively easily when the transverse pin is damaged. The opening is preferably a blind hole, in which a thread is provided.

The object is further solved through a rotor blade attachment, in particular for a wind power plant, in particular at least partially with the aforementioned characteristics of a rotor blade attachment according to the invention, for the connection of a rotor blade with an attachment device, comprising a transverse pin in operative connection with a connecting device, wherein at least the connecting device is pretensioned, further established in that the material of the rotor blade includes a structure made of fiber reinforced plastic layers and reinforcing material including layers made of a metal at least in the area of the transverse pin.

Through the use of a reinforcing material comprising a metal, which can in particular be exclusively made of metal, the pressure resistance of the entire structure in the case of comparable thickness is increased in comparison to exclusively fiber reinforced plastic layers. This increase is preferably at least 30%. In particular, the bearing stress resistance of this used structure made of fiber reinforced plastic layers and reinforcing material including layers made of a metal is also clearly increased with respect to the bearing stress resistance of a structure made exclusively of fiber reinforced plastic layers, whereby in particular the diameter of the transverse pins can be reduced for the connection or also the wall thickness of the entire blade attachment, whereby an increased density of the transverse pins or connecting devices for the rotor blade attachment is again enabled.

Preferably, the area in which the material of the rotor blade includes a structure made of fiber reinforced plastic layers and reinforcing material including layers made of a metal extends to the area, in which a force affects the material of the rotor blade due to the pretensioning. This area preferably extends to the area of the rotor blade root.

In a particularly preferred embodiment of the rotor blade attachment according to the invention, an at least partially from layer to layer, in particular constant, elongation of the layers of the reinforcing material towards the rotor blade tip is provided in a transitional area for the adjustment of the structure of the rotor blade root to the structure of the rotor blade. It can also partially contain an elongation of the layers from layer to layer such that two following layers can also have the same length or several following layers can also have the same length. It should however mainly be ensured that from layer to layer a partial reduction in the length and then again an elongation of the layers does not take place.

The reinforcing material is preferably metal or is made exclusively of metal. The metal is preferably available as a film or grating, wherein film is understood in particular as a two-dimensional material and grating as connected rods or connected fibers made of metal or a sheet that has holes.

The thickness of the film preferably lies between 0.1 mm to 0.8 mm, in particular between 0.15 mm to 0.5 mm, in particular between 0.2 mm and 0.3 mm.

The thickness of the fiber reinforced plastic layers preferably lies between 0.2 mm and 1 mm, in particular between 0.4 mm and 0.9 mm, in particular between 0.6 mm and 0.7 mm.

In order to enable a load-capable distribution of the fibers in the fiber reinforced plastic layers, it is preferably provided that at least one part of the fiber reinforced plastic layers has unidirectionally aligned fibers that are aligned in the longitudinal and axial direction of the rotor blade.

If the longitudinal axis of the connecting device mainly aligns with the middle axis of the rotor blade wall, in particular lies in the same plane as it, a very stable rotor blade attachment is possible.

The connecting device preferably includes a screw, in particular an antifatigue-shaft screw. Within the framework of the invention, a screw is also understood as a bolt combined with a nut, wherein the bolt is at least partially provided with a thread or several threads. The connecting device can also include a rivet connection or another type of connection, for example a form-fit and/or friction-fit connection. Several connecting devices are preferably provided that are in operative connection with at least one transverse pin. The operative connection preferably creates a pretension.

Through the rotor blade attachments according to the invention, it is in particular possible to ensure a secure rotor blade attachment with transverse pins, which has a comparable or smaller diameter than known rotor blade attachments.

A rotor of a wind power plant preferably includes at least one rotor blade, a rotor hub and at least one rotor blade attachment according to the invention, which is described above.

A wind power plant with a rotor blade attachment, which was described above, is preferably used.

The invention is described below, without restricting the general intent of the invention, based on exemplary embodiments in reference to the drawings, whereby we expressly refer to the drawings with regard to the disclosure of all details according to the invention that are not explained in greater detail in the text.

DETAILED DESCRIPTION OF THE INVENTION

In the following figures, the same or similar types of elements or corresponding parts are provided with the same reference numbers in order to prevent the item from needing to be reintroduced.

Figure 1:
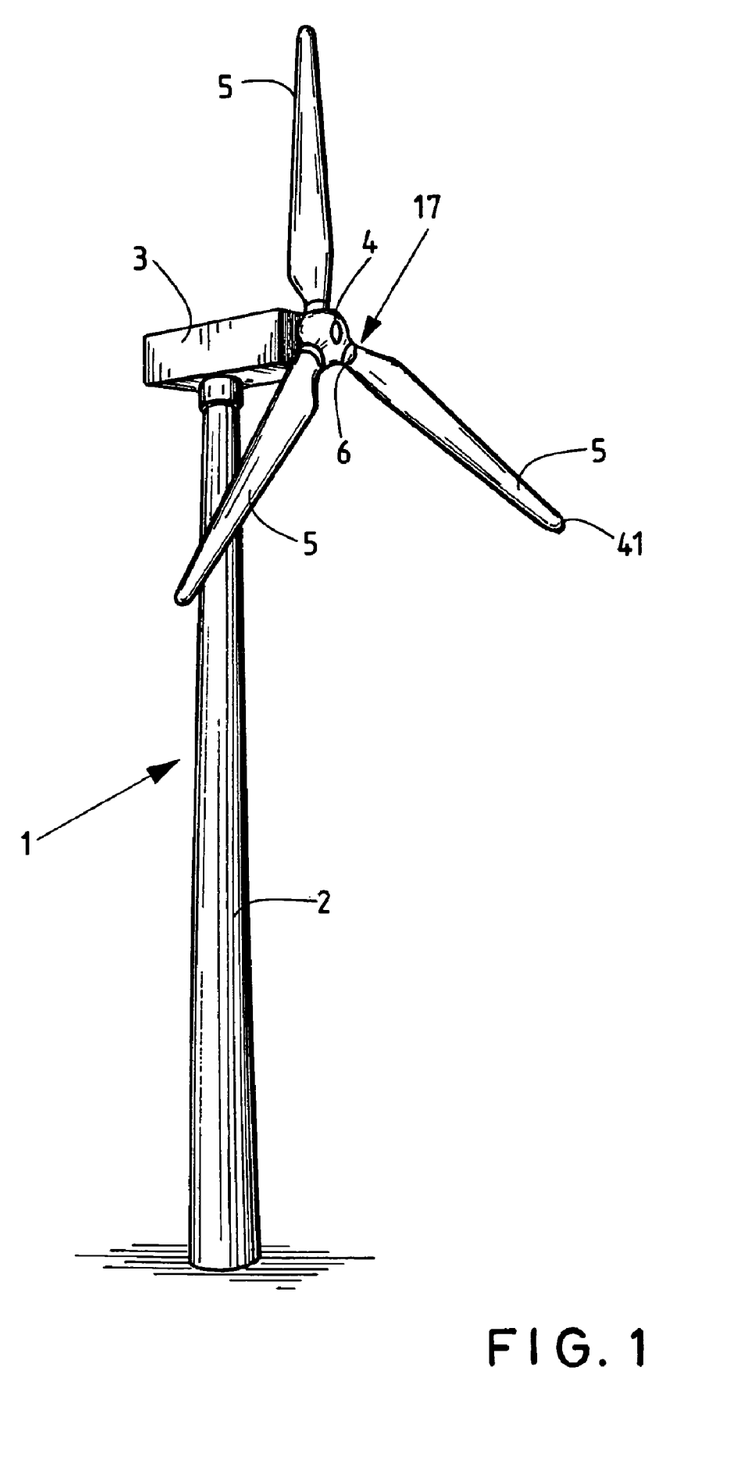
FIG. 1 shows a schematic three-dimensional representation of a wind power plant according to the state of the art.

FIG. 1 shows a schematic three-dimensional representation of a wind power plant 1 according to the state of the art. The wind power plant 1 comprises a tower 2, to which a tower head 3 is attached, which normally has a generator that is not shown. A rotor hub 4 is also shown, to which rotor blades 5 are connected to the blade root 6 with the rotor hub 4. A rotor blade attachment 17 is also indicated schematically and a rotor blade tip 41, which is used to explain the drawings below.

Figures 2, 3:
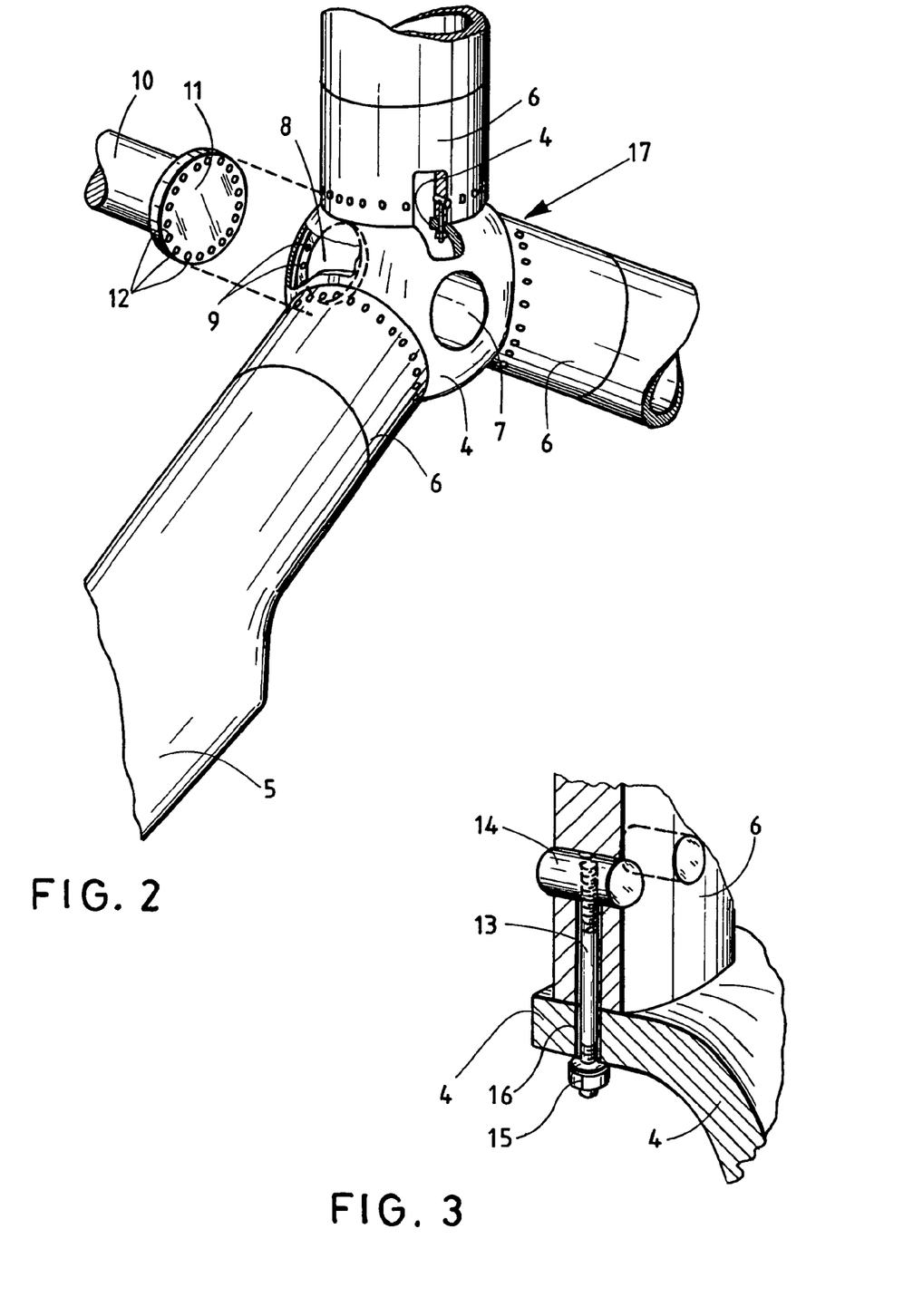
FIG. 2 shows a schematic three-dimensional representation of a section of a wind power plant from FIG. 1.
FIG. 3 shows a schematic representation of a section of FIG. 2 according to the state of the art.

FIG. 2 shows a schematic three-dimensional view of a part of the wind power plant 1 from FIG. 1 of the state of the art. The rotor hub 4 can be connected with a generator via screw connections (not shown), which can be provided through flange holes 9 and holes 12, via a flange 11 and a generator shaft 10. In order to be able to make the corresponding connections, openings 7 and 8 are provided in the rotor hub 4. The rotor blades 5 are connected with the rotor hub 4 at the blade roots 6. Screws 13 as per FIG. 3, transverse pins 14 and nuts 15 are provided for the connection, wherein corresponding holes 16 or bore holes are provided in the respective material in order to enable a connection. Corresponding openings 7 and 8 are provided in rotor hub 4 for tightening the nuts 15. A pretension is created by the fastening of nuts 15.

Figure 4:
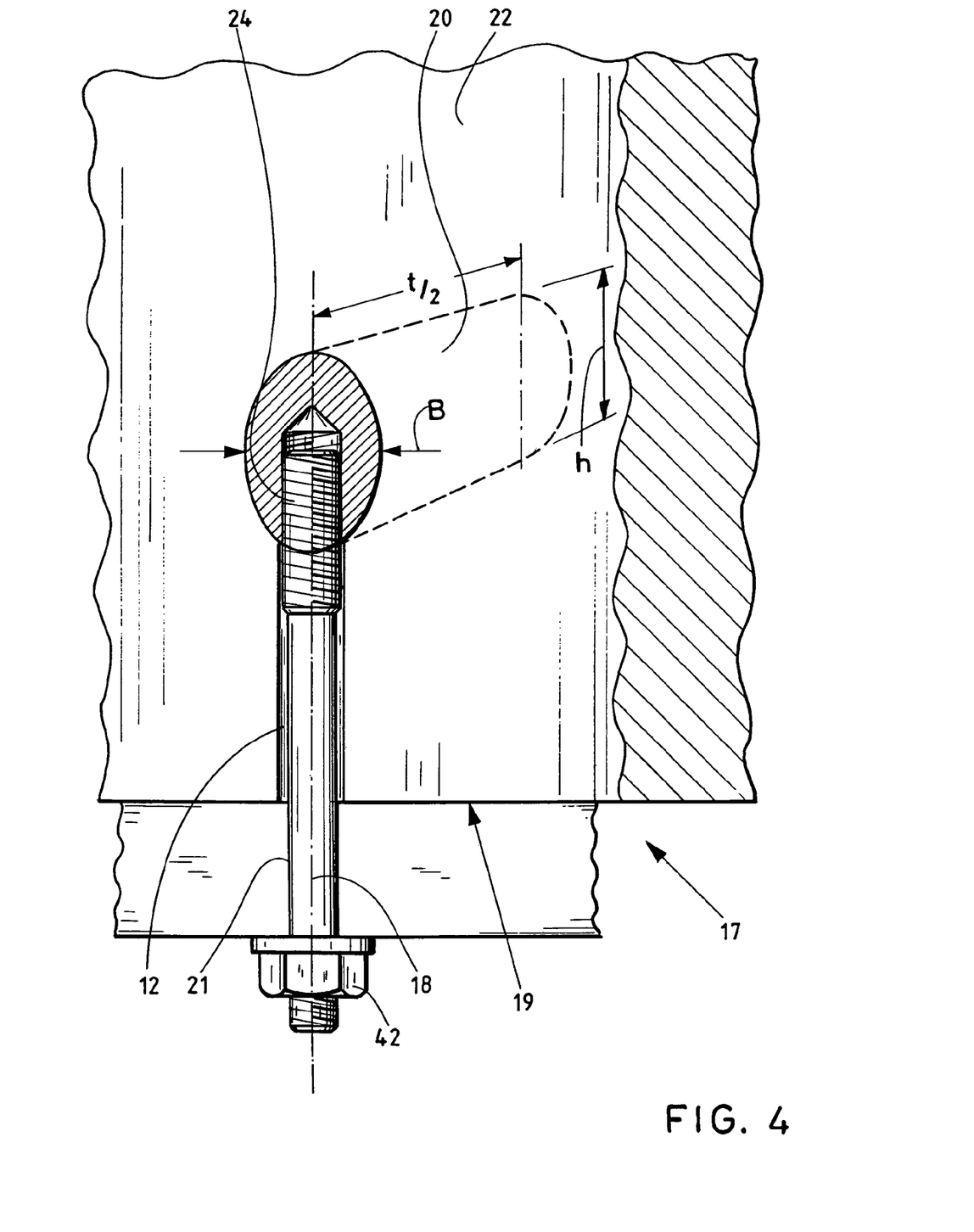
FIG. 4 shows a schematic partial sectional view of a rotor blade attachment according to the invention.

FIG. 4 shows a schematic sectional view of a rotor blade attachment 17 according to the invention. A transverse pin 20, which has a greater height h than width B, is inserted into a wall 22 of the blade root. The represented depth $t/2$ corresponds with half of the actual depth t of the transverse pin 20, since FIG. 4 covers a sectional view along approx. half through the material of the wall 22. The transverse bolt 20 has a cross-section that is elliptical in this exemplary embodiment. For the laminate that is contained in the material of the wall 22, an ellipsis is the optimal shape for receiving the corresponding forces in the case of the pretensioning, which based on the screwing of the screw 21 or the blade bolt 21 into the thread 24, which is provided in the transverse pin 20. A variant with a pin or bolt provided with threads on two ends as well as a variant with a screw 21 can both be provided. The bolt variant is provided in FIG. 4. A rectangle, preferably with rounded edges in the cross-section or an eight or a soft double T is a preferred form for the stability of the transverse pin 20 or transverse bolt. For production, it is simpler or preferred to provide a type of elongated hole in the wall 22 in order to insert a transverse pin 20, which is shown schematically in cross-section in FIG. 5. The transverse pins 20 in FIGS. 4 and 5 have a blind hole 25 with thread.

Figure 5:
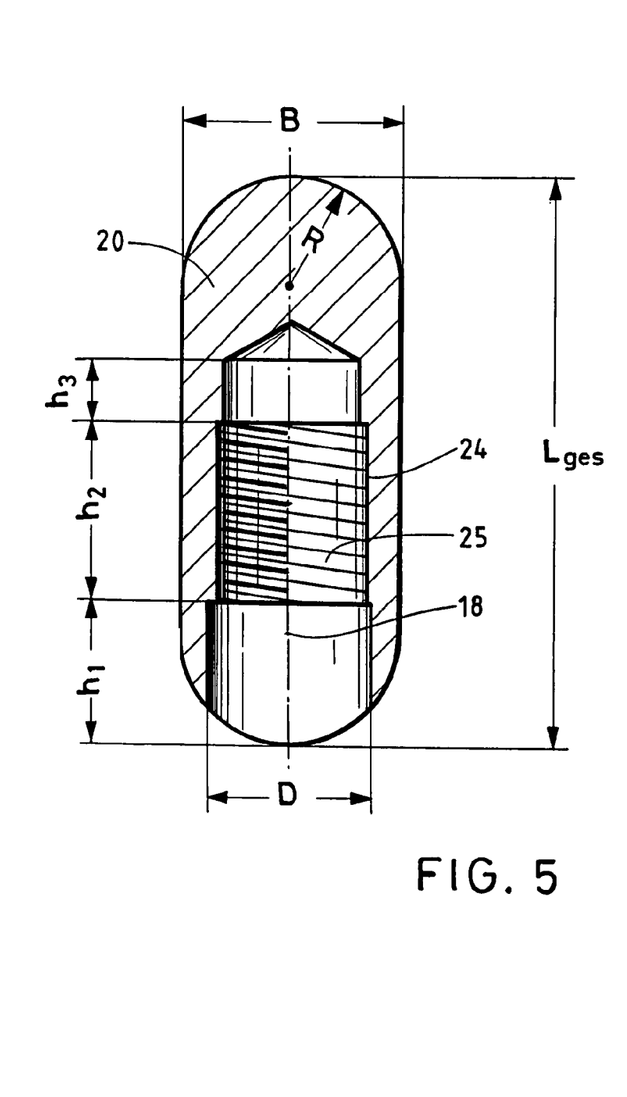
FIG. 5 shows a schematic sectional view of a transverse pin according to the invention.

In the case of a 45-m-long rotor blade, the overall length $L_{ges}$ or height h of the transverse pin 20 is preferably approx. 2.5×the width B. The width B is preferably in the range of 1.5 to 1.7×the size of the screw thread, i.e. 45 mm to 50 mm in the case of an M30 screw. The position of the thread is approx. the middle of the transverse pin 20 or bolt. A relatively large free bore hole is advantageous despite a corresponding cross-section loss, since the local loads at the tensile-loaded bore hole edge hereby drop, which has a positive effect on the service life. A high material quality should be selected in order to be able to manage with a low screw-in depth. It can also be advantageous to provide the tensile-loaded bore hole edge with constant residual compressive stress. This can, for example, occur through shot-peening or elongating or suchlike. This also increases the service life of the transverse pin 20. It can also be provided, through special thread forms, such as a buttress thread, to reduce the radial forces that want to expand the thread. It can also be provided to provide the screws or bolts or thread pins with a reduced shaft and/or if applicable with a fine thread in the transverse bolt or transverse pin area.

Regular screw threads are preferably provided in the area of the assembly screw connection for the nut 42, i.e. in the case of a screw connection in the field under more difficult conditions. As in FIG. 4, the cross-section can be designed in an elliptical form, which can contribute to an optimal load in the laminate cross-section. The position of the transverse pin 20 should preferably be provided as close as possible to the blade root. The laminate wall thickness in the wall 22 should lie in the range of 2×the width B to 3×the width B. × is the multiplication operator. For better visualization, the blade-root-side end 19 of the blade root is also shown and the longitudinal axis 18 of the reduced shaft bolt 21.

The preferred embodiment of the transverse pin 20 in FIG. 5 is represented in that B is in the area of 45 mm, the overall height $L_{ges}$ in the area of approx. 110 mm, wherein a thread M27 is used and the diameter D of the blind hole lies in the lower area at approx. 32 mm, $h_1$ is approx. 30 mm and $h_2$ is approx. 30 mm. The thread 24 is also provided in the area of $h_2$ and $h_3$ and is approx. 15 mm. This then results in a laminate thickness of preferably 100 mm. The overall depth t is thus approx. 100 mm.

Figure 6:
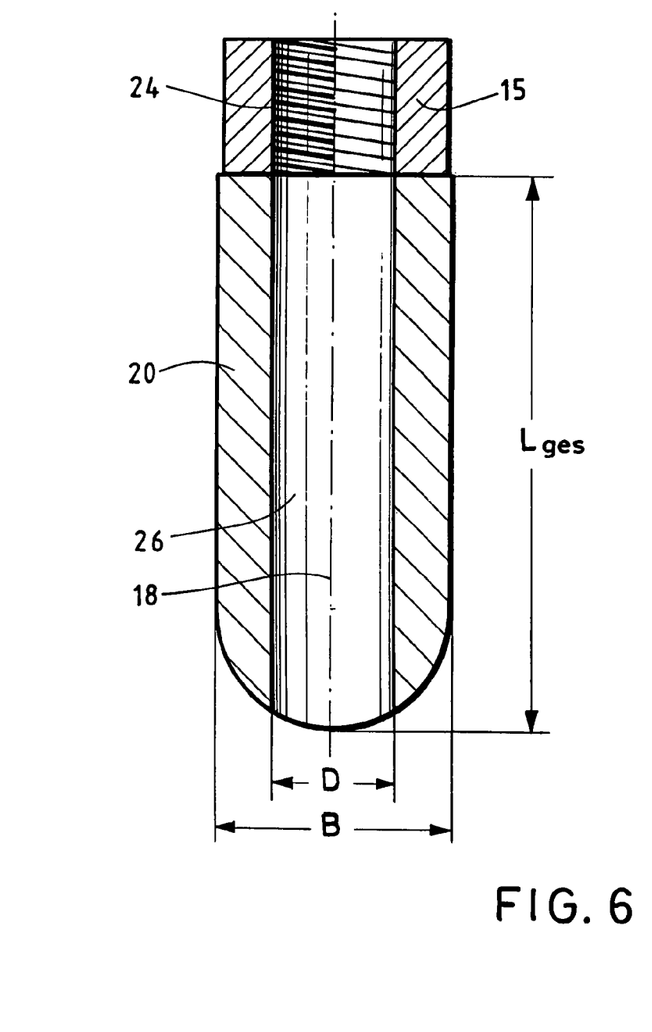
FIG. 6 shows a schematic sectional view of another transverse pin according to the invention.

FIG. 6 shows an alternative transverse pin 20. It is a partially oval transverse pin, which has a through bore hole 26 or a through hole 26. It is hereby provided to provide the smallest possible diameter D for the bore hole in order to achieve a maximum cross-section surface $B \times t - \pi/4 \times D^2$. The width B can be in the range of the exemplary embodiment according to FIG. 5. The overall height $L_{ges}$ is preferably greater than 2.5×the width B. A nut 15 is then also provided with a thread 24 outside of the through hole 26. The nut 42 can be connected with the transverse pin 20. Form-fitting elements can also be provided in order to simplify the screwing of a screw into the thread 24 of the nut 15 during assembly.

Figure 7:
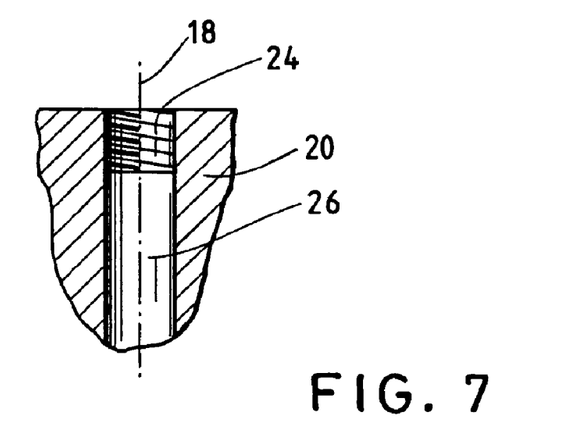
FIG. 7 shows a schematic sectional view of yet another transverse pin according to the invention.

FIG. 7 also shows a schematic view of another embodiment of a transverse pin 20. In this exemplary embodiment, the through hole 26 in the upper area is provided with a thread 24. Through the longish form of the transverse pin 20, the rotor blade attachment has a higher resisting torque, whereby the transverse pin can be designed narrower than in the state of the art.

Figure 8:
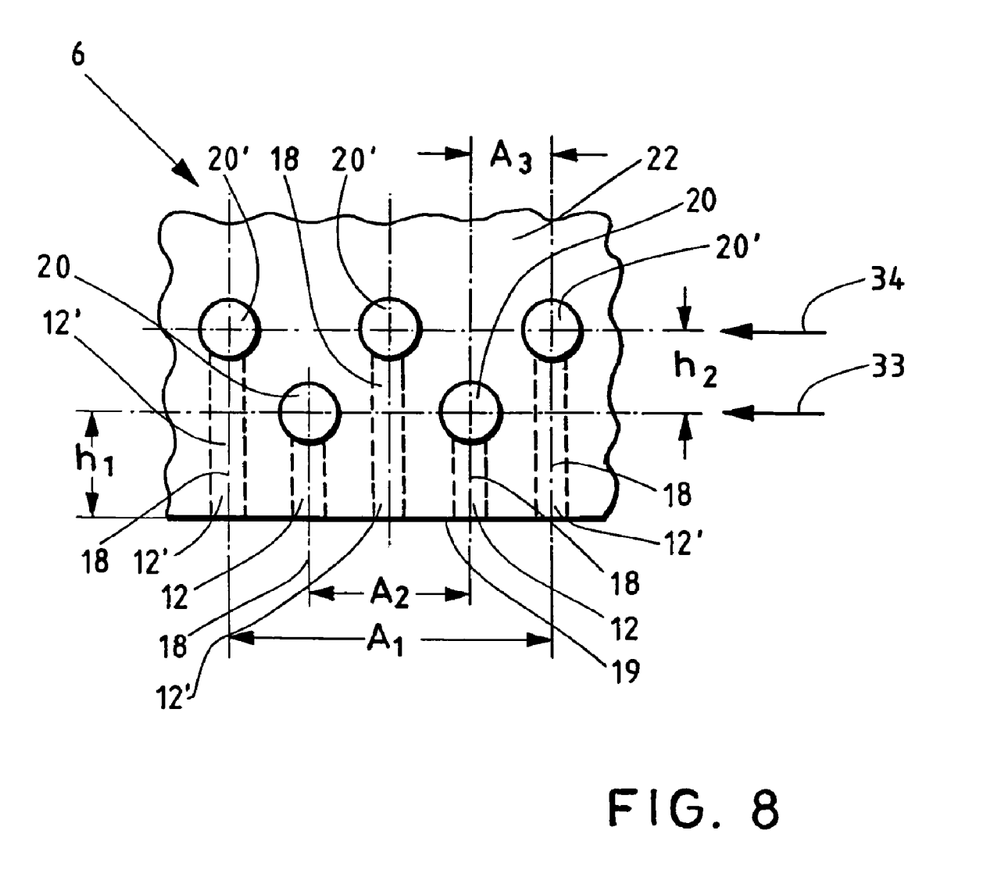
FIG. 8 shows a schematic view from the top of part of a blade root.

FIG. 8 shows a schematic view from the top of a part of a blade root 6 according to the invention. The bending or rounding provided in the blade root is disregarded in this representation. Two rows 33 and 34 of transverse pins 20, 20' are provided, which can be connected with connection screws through corresponding holes 12, 12', so that a corresponding pretensioning of the blade root 6 is made possible with e.g. a rotor hub or a connection flange. The rotor hub or the connection flange is not shown in FIG. 8. In the state of the art, it is such that the number of connection pairs of transverse pin and screw, all of which are provided in one single row, lie at the same distance from the blade flange or from the blade-root-side end 19. The number of these connection pairs is determined through the thread diameter of the axial bolt or transverse pin 20, 20' and the invasive load. The loads increase with an increasing blade length, whereby the bending moment in the transverse bolt increases, which is why the transverse bolt must be thicker. For this reason, only a few transverse bolts can be arranged around the perimeter of the blade root 6, whereby the load impacting the individual transverse bolts increases. The invention now provides at least two levels of transverse bolts or at least two rows 33, 34 of transverse bolts with different distances from the blade root on the blade-root-side end 19. The forces can hereby be correspondingly subdivided and the distances of the respective transverse pins 20 or 20' can be decreased, whereby an increased number of transverse pins 20, 20' can be used. More bolt pairs can hereby be arranged in the case of the same perimeter of the blade root. The diameter of the blade root can also be designed smaller compared to the blade length. A platform strategy can also be implemented in a larger area of the rotor diameter.

In the case of a 45-m-long rotor blade, the transverse pin 20 preferably has a diameter of 60 mm. As an axial bolt or screw connection, an M30 screw or an M30 bolt with 24 mm shaft is provided for the first row 33 of the transverse pin 20, which is inserted through the hole 12, and longer bolts or screw connections with a 20 mm shaft for the second row 34 of transverse pins 20', which are inserted through the longer holes 12'. The diameter of the blade root or the circle defined by the transverse pins is approx. 2.11 m. The preferred distance of the first pin row from the blade-root-side end 19 is preferably approx. 150 mm and the distance of the second pin row 34 from the blade-root-side end 19 is preferably approx. 215 mm. The laminate thickness is preferably approx. 100 mm. Material values are provided for the overall laminate that enable a laminate rigidity in the blade length direction of approx. 30,000 N/mm$^2$ and a shear rigidity of the laminate of approx. 5,000 N/mm$^2$. As mentioned above, h1 is approx. 150 mm and h2 65 mm. A1 is approx. 332 mm and A2 166 mm. A3 is approx. 83 mm. It makes sense for the stability of the transverse pins if the laminate rigidity in the blade longitudinal axis is as high as possible, i.e. the most possible unidirectional layers are provided in the blade length direction, i.e. with 0° to the blade longitudinal direction. The load is best distributed between the two rows 33 and 34, if the modulus of rigidity of the laminate is as high as possible, i.e. the most possible +/−45° layers of the laminate are provided. A preferred ratio of the phase orientations in the blade root 6 is approx. 55% 0° unidirectional layers, 14% 90° unidirectional layers, and 31%+/−45° layers.

The second row of transverse bolts 34 receives an increased load compared to the first row 33 since it lies in front in terms of the blade load. In order to enable the comparability of the force distribution between the two rows, the screw bolts of the second row should be designed softer than those of the first row. This takes place, for example, through the provision of bolt or screw shafts with different thicknesses, which are brought into operative connection with the transverse pins 20'. Instead of the transverse pins with a circular cross-section, different transverse pins can also be provided, as mentioned above, that have in particular a greater height than width.

The second row 34, in particular, can hereby also be designed softer than the first row 33 of the transverse pins 20, 20'. A strain or tension inflation mainly occurs on the hole edge of the transverse pins 20, 20'. Thus, the hole rows can also be pushed closer together than currently shown in this example. For example, a divide of 166 mm and a separation distance of the hole rows of 65 mm is provided. The distance from the hole rows to the root-side end 19 can be a bit smaller than shown so that the difference in the bolt length or screw length is reduced.

Figure 9:
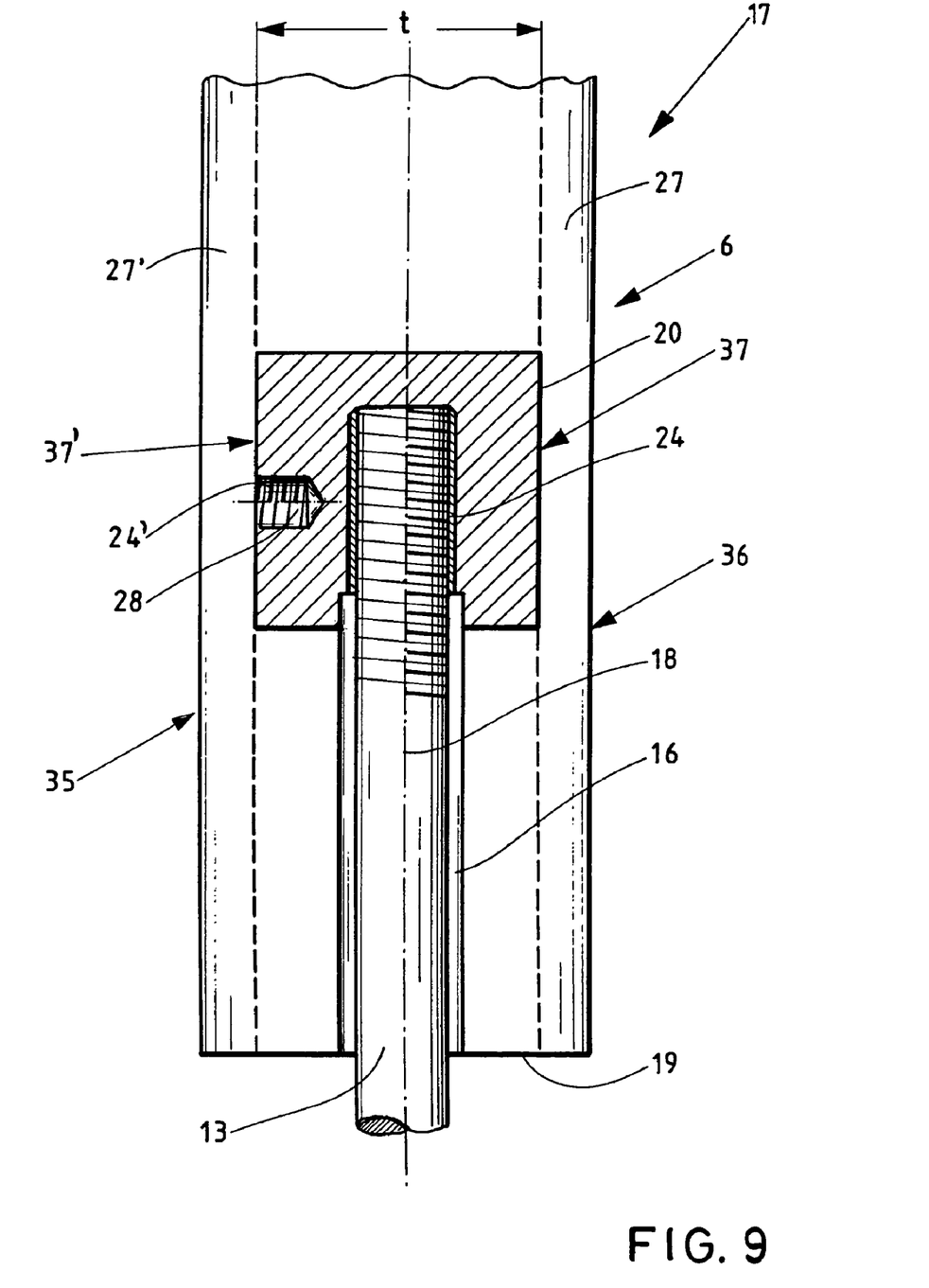
FIG. 9 shows a schematic sectional view of a rotor blade attachment according to the invention.

FIG. 9 shows a schematic sectional view of another rotor blade attachment 17 according to the invention.

In this exemplary embodiment, a somewhat shorter transverse pin 20 in terms of depth t is used, which is provided with cover laminate 27, 27' on the pin sides 37 and 37' to the inner surface 35 or the outside surface 36 of the rotor blade or the blade root 6. This results in a complete encapsulation of the transverse pin 20. This increases the strength of the combination of the transverse pin 20 with the blade root 6. This is produced such that the root laminate is first produced in the thickness needed in order to support the transverse pin 20. This laminate is then provided with the bore holes for the transverse pins 20 and also with the bore holes for the screws 13. The transverse pins 20 are then installed. Enough additional laminate is then inserted from inside and outside around the central laminate in order to transfer the loads from the rotor blade securely to the central laminate ring. A particularly advantageous embodiment of this attachment principle or this rotor blade attachment is to produce the central laminate part in a glass fiber metal hybrid laminate.

Through the embodiment of the rotor blade attachment according to FIG. 9, more bolt pairs or pin/screw pairs can be used than in the case of a conventional bolt arrangement.

During the production of the rotor blade, the blade half shells can first be dry and not yet rimed (RIM=Resin Infusion Molding). The belt is then inserted in the form of unidirectional glass fibers or carbon fibers. A half ring with prefabricated transverse pin connections or preconnections are produced and attached. This is followed by a vacuum RIM and a subsequent adhering of the blade half shells. This production process requires a relatively good joint accuracy. As the completion of the blade-root-side end 19, a steel plate could also be provided that is attached or adhered with modified adhesive thickness to the blade-root-side end 19 of the blade root or the rotor blade.

An alternative procedure or an alternative method is that the belt is installed after the provision of the blade half shells, the riming, in particular vacuum riming, takes place, then an adhering of the blade half shells, then the provision of the corresponding holes for the transverse pins and the screw connection and then an adhering of an inner and outer ring, which is made up of a total of three or four parts. If the attachment is conical, three parts are provided and if the attachment is cylindrical, four parts are provided. FIG. 9 also shows a threaded blind hole 28, which is provided with a thread 24', in order to be able to replace it easily when the transverse pin 20 is defective. For this, the laminate in the area of the transverse pin 20 is removed from the inner surface 35, a screw is screwed into the blind hole 28, the transverse pin 20 is pulled out, a new transverse pin 20 is inserted and the laminate 27' is reapplied again. This exemplary embodiment can also be combined with the aforementioned exemplary embodiments.

Figure 10:
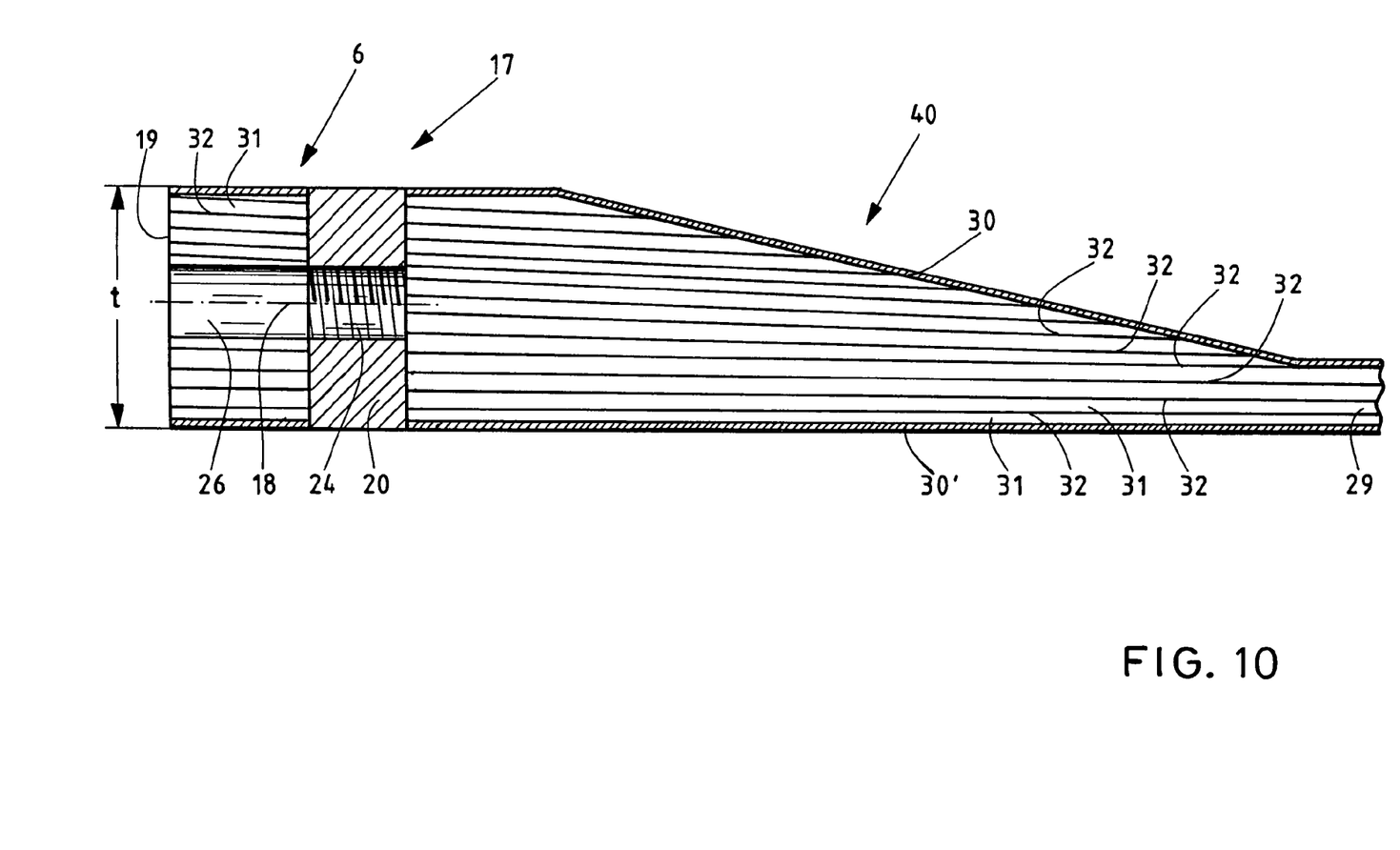
FIG. 10 shows a schematic sectional view of a rotor blade attachment according to the invention and FIG. 11 shows another schematic sectional view of a rotor blade attachment according to the invention.

FIG. 10 shows a schematic sectional view of a rotor blade attachment 17 according to the invention. A blade root 6 in the transition to the normal blade shell laminate of the rotor blade 5 is mainly shown. In this exemplary embodiment, the idea is realized to increase the permissible surface pressure or bearing stress resistance by provided metal layers 32. It should be taken into consideration that the provided transverse pins 20 are subjected to a very high pretension in the installation with a screw not shown in FIG. 10. The metal sheet or metal films, which are present in a metal layer 32, are preferably so thin that they can independently take on the form of a semi-circle, for example. They preferably have a thickness between 0.2 mm and 0.4 mm. The structure that results is a hybrid structure made of alternating metal layers 32 and glass fiber reinforced plastic layers 31. The thickness of the glass fiber layers is 1.2 mm in this exemplary embodiment. The steel share is 20% when the glass fiber reinforced plastic is 1.2 mm thick and the steel, for example, is 0.3 mm thick. The screw additional force drops in particular in the case of tensile loading since the ratio of the rigidity of the tensioned parts to the rigidity of the tensile-loaded part becomes more advantageous. This results in a more advantageous influence on the tension ratio of the screw connection, whereby the additional load in the transverse pin 20 is also decreased considerably. The bearing stress resistance is also increased considerably by the high pressure resistance of metal.

Through the asymmetrical arrangement of the layers, i.e. in this exemplary embodiment, the layer by layer reduction in the length of the layers in the axial direction of the longitudinal axis of the rotor blade or the longitudinal axis 18 of the screw (not shown) or the longitudinal axis 18 of the through bore hole 26, very fast and simple production and production control are enabled. Unidirectional glass fiber mats in the longitudinal direction of the rotor blade are also preferably used for production, in order to be able to evenly distribute plastic in the RIM process. However, in order to reduce temperature-induced stress between the glass fiber reinforced plastic and the steel, it makes sense to also introduce sufficient fibers unidirectionaly in the circumferential direction.

The layer-wise transition each with shorter layers of glass fiber reinforced plastic and metal is easy to identify, in particular in the transition area 40.

The lower layers 31 shown in FIG. 10 are preferably designed throughout into the outer area of the blade.

In order to avoid corrosion, a cover layer 30 or 30' is provided.

Figure 11:
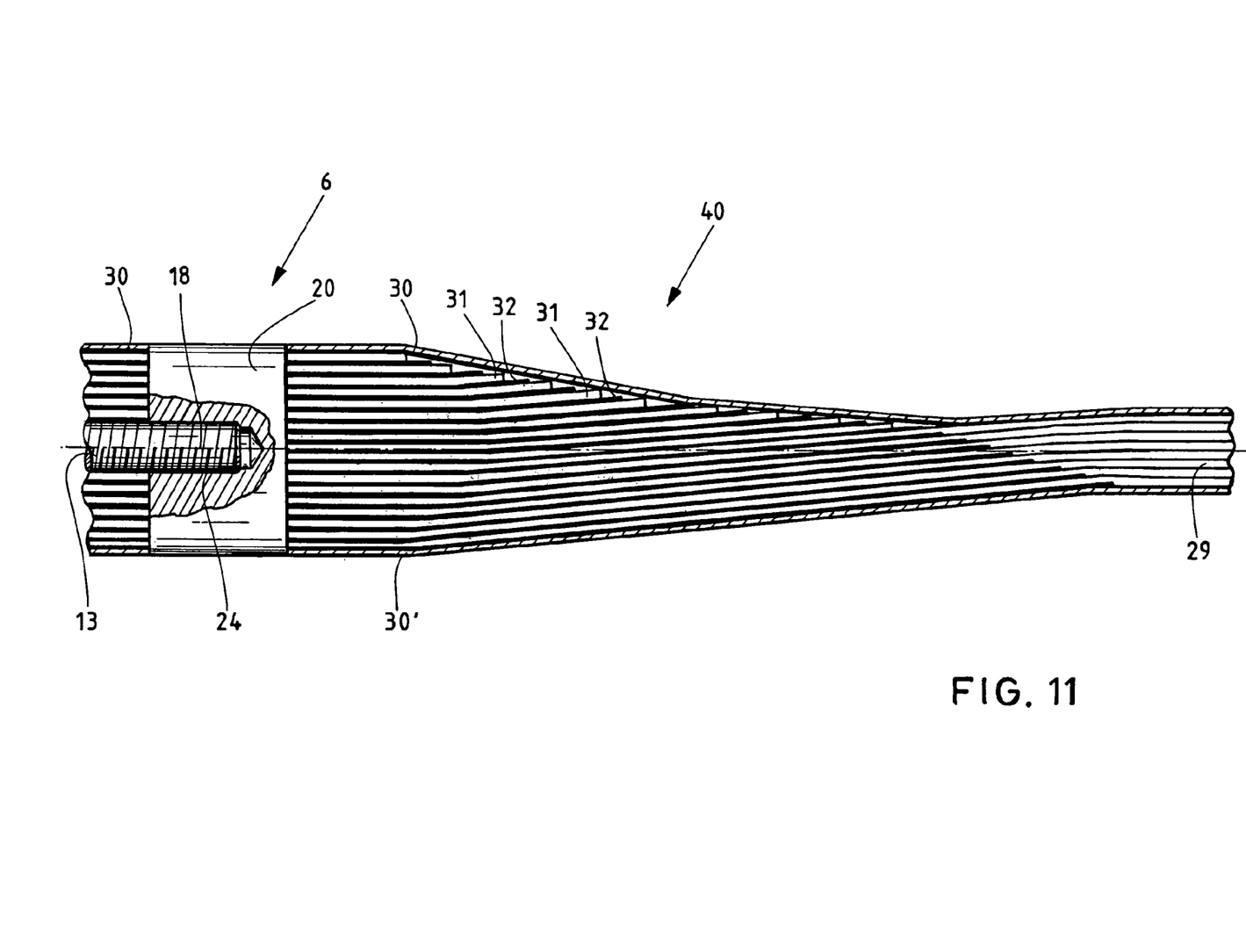

FIG. 11 shows a schematic sectional view of another rotor blade attachment 17 according to the invention, in which a type of hybrid layer made of metal layers and glass fiber reinforced plastic layers is also provided. In contrast to the exemplary embodiment according to FIG. 10, the lower area shown in FIG. 11 is also shown bent in cross-section, which is particularly recognizable on cover layer 30'. The middle axis of the blade wall mainly lies above the other with the screw longitudinal axis 18.

Aluminum or titanium or another metal can also be used instead of steel. Instead of an integrated sheet or an integrated film made of metal, a perforated metal layer 32 or several perforated metal layers 32 can also be used. This leads to a better distribution of the plastic in the blade root 6 and in the transition area 40.

In the exemplary embodiments according to FIG. 10 and FIG. 11, the depth t can be 50 mm to 100 mm on the blade-root-side end of the rotor blade. The diameter of the transverse pin 20 can be 45 mm. The distance from the blade-root-side end to the middle of the transverse pin 20 is approximately 2.5×the diameter of the transverse pin 20, that is approx. 112 mm. The transition area 40 also begins to narrow approximately at 112 mm from the middle of the transverse pin 20. These dimensions preferably apply for a rotor blade of 40 m to 45 m. The narrowing of the rotor blade in the transition area 40 can extend over a section of 300 mm to approx. 1,400 mm. The thickness of the supporting laminate of the blade shell at 29 is then approx. 15 mm to 20 mm. The exemplary embodiments according to FIGS. 10 and 11 can also be combined with the aforementioned embodiments according to the invention.

LIST OF REFERENCES

1 Wind power plant
2 Tower
3 Tower head
4 Rotor hub
5 Rotor blade
6 Blade root
7 Opening
8 Opening
9 Flange hole
10 Generator shaft
11 Flange
12, 12' Hole
13 Screw
14 Transverse pin
15 Nut
16 Hole
17 Rotor Blade Attachment
18 Longitudinal axis
19 Blade-root-side end
20, 20' Transverse pin
21 Expanding bolt
22 Wall
23 Flange
24, 24' Thread
25 Blind hole
26 Through hole
27, 27' Cover laminate
28 Thread blind hole
29 Blade shell laminate
30, 30' Cover layer
31 Laminate layer
32 Metal layer
33 First row
34 Second row
35 Inner surface
36 Outer surface
37, 37' Pin side
40 Transition area
41 Rotor blade tip
42 Nut
$L_{ges}$ Overall height
t Depth h Height
B Width
D Diameter
R Radius
A Separation distance

The invention claimed is:

1. Rotor blade attachment (17), of a wind power plant (1), for the connection of a rotor blade (5) with an attachment device (14), comprising:
   a transverse pin (20, 20'), and
   a connecting device (13, 21), which can be brought together with the transverse pin to establish an operative connection,
   wherein the connecting device (13, 21) defines a longitudinal axis (18),
   and wherein in the direction of the longitudinal axis (18) of the connecting device (13, 21), the transverse pin (20, 20') has a higher bending stiffness than transversally to the longitudinal axis (18).

2. Rotor blade attachment (17) according to claim 1, wherein the transverse pin (20, 20'), in the direction of the longitudinal axis (18) of the connecting device (13, 21), has a greater elongation than transversally to the direction of the longitudinal axis (18) of the connecting device (13, 21).

3. Rotor blade attachment (17) according to claim 2, wherein the transverse pin (20, 20') is designed with a rectangular cross-section with rounded edges.

4. Rotor blade attachment (17) according to claim 2, wherein the transverse pin (20, 20') is designed with an elliptical or oval cross-section.

5. Rotor blade attachment (17) according to claim 2, wherein the transverse pin (20, 20') is designed with a double-T-shaped cross-section with rounded edges.

6. Rotor blade attachment (17), according to claim 1, further comprising:
   additional transverse pins (20, 20'), each of which can be brought together to establish an operative connection with an additional connecting device (13, 21),
   wherein the plurality of transverse pins (20, 20') are arranged in at least two rows (33, 34), and
   wherein at least a first row (33) is arranged closer to the blade-root-side end (19) of the rotor blade (5) than at least one second row (34).

7. Rotor blade attachment (17) according to claim 6, wherein the rows (33, 34) are arranged (5) around the perimeter of the blade root (6).

8. Rotor blade attachment (17) according to claim 6, wherein the operative connection of the connecting devices (13, 21) with the transverse pins (20'), which are arranged in the second row (34), is made softer compared to the operative connection of the connecting devices (13, 21) with the transverse pins (20), which are arranged in the first row (33) by one or more of the following conditions:
   the connecting devices (13, 21), which are assigned to the first row (33) of transverse pins (20), are thicker than the connecting devices (13, 21), which are assigned to the second row (34) of transverse pins (20'), or
   the connecting devices (13, 21), which are assigned to the first row (33), are shorter than the connecting devices (13, 21), which are assigned to the second row (34), or
   wherein the connecting devices (13, 21), which are assigned to the first row (33), are made from a different material than the connecting devices (13, 21), which are assigned to the second row (341).

9. Rotor blade attachment (17) according to claim 8, wherein the connecting devices (13, 21), which are assigned to the first row (33), are shorter than the connecting devices (13, 21), which are assigned to the second row (34).

10. Rotor blade attachment (17) according to claim 6, wherein the connecting devices (13, 21) are different in length.

11. Rotor blade attachment (17) according to claim 6, wherein the connecting devices (13, 21) are at cat partially different in thickness.

12. Rotor blade attachment (17) according to claim 11, wherein the connecting devices (13, 21), which are assigned to the first row (33) of transverse pins (20), are thicker than the connecting devices (13, 21), which are assigned to the second row (34) of transverse pins (20').

13. Rotor blade attachment (17), according to claim 1, wherein the transverse pin (20, 20') is completely encapsulated by the rotor blade (5).

14. Rotor blade attachment (17) according to claim 13, wherein the encapsulation of the sides (37, 37') of the transverse pin (20, 20') facing the outside surface (36) and the inner surface (35) of the rotor blade (5) occurs through a material (27, 27') used in the rotor blade (5), through at least one laminate layer (27, 27').

15. Rotor blade attachment (17) according to claim 14, wherein the at least one laminate layer (27, 27') is strengthened through one or more reinforcing metal layers (32).

16. Rotor blade attachment (17) according to claim 14, wherein the sides (37, 37') of the transverse pin (20, 20''') facing the outer surface (36) and the inner surface (35) of the rotor blade (5) are encapsulated with a material thickness of 5 mm to 20 mm, in the case of a 35 m to 55 m long rotor blade (5).

17. Rotor blade attachment (17) according to claim 13, wherein the encapsulating material (27, 27') reaches more than one diameter of the transverse pin beyond the area of the transverse pin (20, 20') inserted in the rotor blade (5).

18. Rotor blade attachment (17) according to claim 13, wherein the transverse pin (20, 20') on at least one side (37, 37'), which faces the inner surface (35) and/or the outer surface (36) of the rotor blade (5), has an opening (28) with a shape, in which a tool of a corresponding shape can be inserted at least indirectly in a form- and/or friction-fit manner.

19. Rotor blade attachment (17) according to claim 18, wherein the opening (28) is a blind hole, in which a thread (24') is provided.

20. Rotor blade attachment (17), according to claim 1:
   wherein at least the connecting device (13, 21) is pretensioned, and
   wherein the material (30-32) of the rotor blade (5) comprises at least in the area of the transverse pin (20, 20') a structure made of fiber reinforced plastic layers (31) and layers made of a metal containing reinforcing material (32).

21. Rotor blade attachment (17) according to claim 20, wherein the area of the transverse pin extends to the area, in which a force affects the material (30-32) of the rotor blade (5) due to the pretensioning.

22. Rotor blade attachment (17) according to claim 20, wherein the area extends to the area of the rotor blade root (6).

23. Rotor blade attachment (17) according to claim 20, wherein in a transition area (40) for the adjustment of the structure of the rotor blade root (6) to the structure of the rotor blade (5, 29) a constant, from layer to layer, elongation of the layers (32) of the reinforcing material (32) towards the rotor blade tip (41) is provided.

24. Rotor blade attachment (17) according to claim 20, wherein the reinforcing material (32) is metal.

25. Rotor blade attachment (17) according to claim 24, wherein the metal is present as a film (32) or grating.

26. Rotor blade attachment (17) according to claim 25, wherein the thickness of the film (32) is between 0.1 mm to 0.8 mm.

27. Rotor blade attachment (17) according to claim 20, wherein the thickness of the fiber reinforced plastic layers (31) is between 0.2 mm and 1 mm.

28. Rotor blade attachment (17) according to claim 20, wherein at least one part of the fiber reinforced plastic layers (31) has unidirectionally aligned fibers, which are aligned in the longitudinal axial direction of the rotor blade (5).

29. Rotor blade attachment (17) according to claim 1, wherein the longitudinal axis (18) of the connecting device (13, 21) mainly aligns with the middle axis (18) of the rotor blade walls (5), and lies in the same plane as it.

30. Rotor blade attachment (17) according to claim 1, wherein the connecting device (13, 21) comprises an antifatigue-shaft screw (21).

31. Rotor blade attachment (17) according to claim 1, wherein several connecting devices (13, 21) are provided, each of which are in operative connection with at least one transverse pin (20, 20').

32. Rotor blade attachment (17) according to claim 1, wherein the operative connection creates a pretension.

33. Rotor (4, 5) of a wind power plant (1) with at least one rotor blade (5), one rotor hub (4) and at least one rotor blade attachment (17) according to claim 1.

34. A wind power plant (1) with a rotor blade attachment (17) according to claim 1.

* * * * *